United States Patent [19]

Murphy

[11] 4,166,660
[45] Sep. 4, 1979

[54] ROLLER ASSEMBLY WITH ROLLER RETENTION SPRING

[75] Inventor: William W. Murphy, Goshen, Conn.

[73] Assignee: The Torrington Company, Torrington, Conn.

[21] Appl. No.: 949,782

[22] Filed: Oct. 10, 1978

[51] Int. Cl.² .................... F16C 19/22; F16C 43/04
[52] U.S. Cl. ........................ 308/202; 29/148.4 A;
   206/318; 308/207 R; 308/212; 308/213
[58] Field of Search .................. 308/202, 207 R, 209,
   308/212, 244, 213; 206/318; 29/148.4 A, 423,
   724, 725

[56] References Cited

U.S. PATENT DOCUMENTS

| | | | |
|---|---|---|---|
| 2,069,569 | 2/1937 | Young | 308/212 |
| 2,215,134 | 9/1940 | Rehnberg | 206/318 |
| 2,860,406 | 11/1958 | Reichardt | 29/148.4 A |
| 3,345,723 | 10/1967 | Stilla et al. | 29/148.4 A |

*Primary Examiner*—Charles E. Frankfort
*Attorney, Agent, or Firm*—Frank S. Troidl

[57] ABSTRACT

A folded spring extends relatively diametrically across the circle of rollers in a roller assembly with each diametral side pressing between two adjoining rollers to wedge these rollers apart circumferentially and thus to press all the rollers against the wall of the bore in a "keystoning" effect with sufficient force to prevent axial movement of the rollers and to radially retain the rollers in the body. The spring is arranged to be subsequently pushed axially from the body.

8 Claims, 10 Drawing Figures

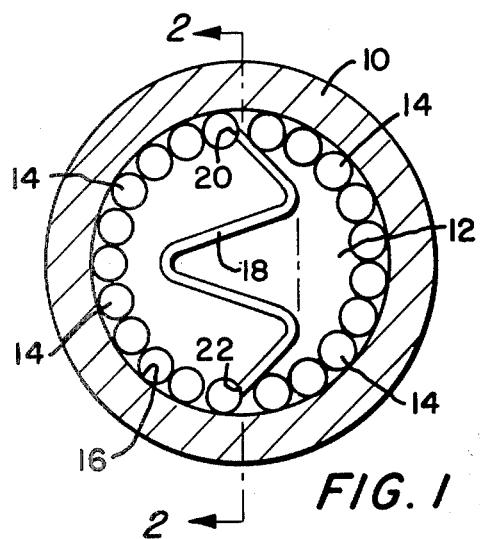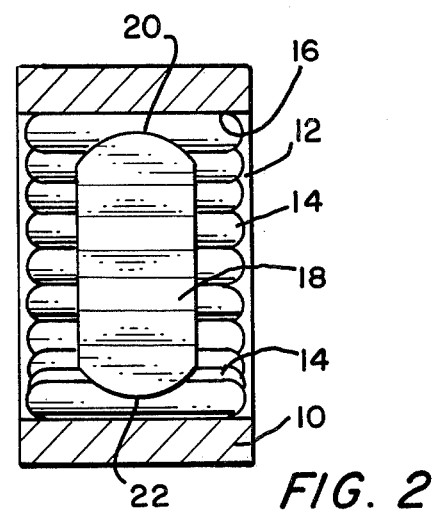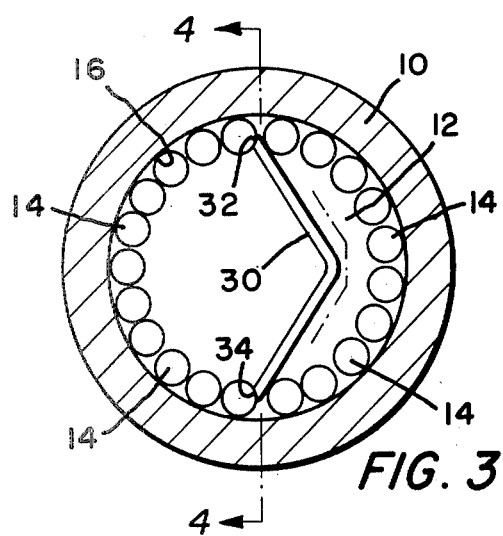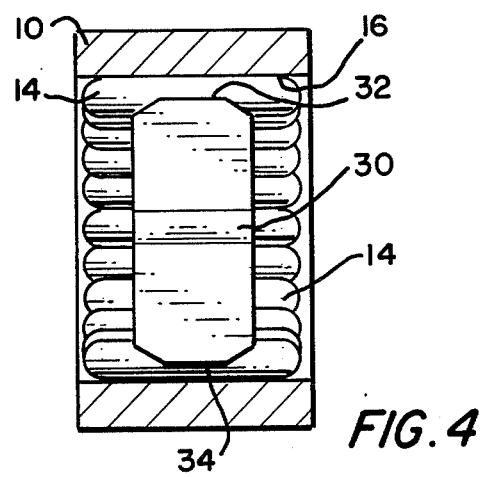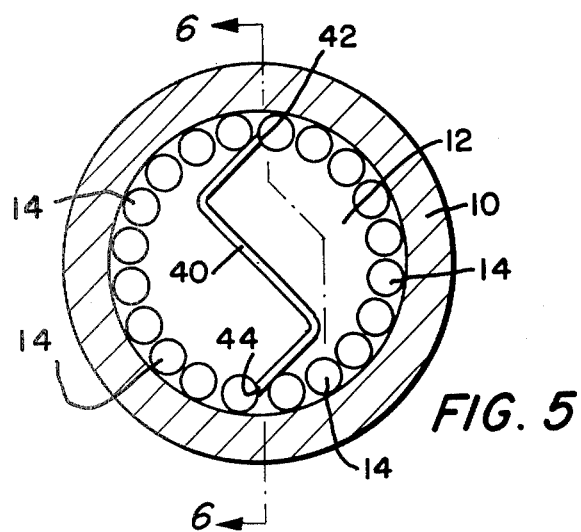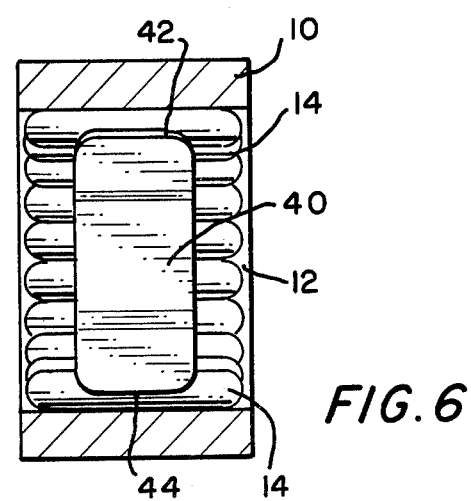

ROLLER ASSEMBLY WITH ROLLER RETENTION SPRING

This invention relates to roller bearings. More particularly, this invention is a novel roller bearing with a novel roller retention mechanism.

For many years full complements of loose rollers have been shipped in bodies with cylindrical bores, such as bearing outer race rings. To keep the rollers in place in the races radially grease or some kind of tube or cylinder inside the circle of rollers, has been used. Usually the outer race includes flanges to keep the rollers axially in place during shipment. However, often it is desired to ship the complement of loose rollers in an outer race which has a bore of the same diameter throughout its length, that is, it has no end flanges. In this situation, the problem of retaining the loose rollers in the race is compounded. It is not practical to consider grease with its slight retention especially in hot climates and if a tube is used, it is necessary to employ an interference fit sufficient to assure that all rollers are forced against the outer race strongly enough so that the roller to race friction prevents axial movement of the rollers. This means that the tube outside diameter has to be larger than the maximum shaft diameter by an amount greater than the diametrical clearance that can occur in the roller and outer race assembly. This often causes problems when inserting the tube within the circle of rollers and when pushing the oversize tube out through a port or bore in the associated mechanism which may result in leaving shreds of the tube material in the bearing of the mechanism in which it is used.

In U.S. Pat. No. 2,215,134, an oversize resilient rubber ball is used to press each roller individually radially outwardly against the outer wall. The resilient rubber ball uses its direct radial force on each individual roller to prevent the loss of the rollers radially inwardly of the circle of rollers and thence out of the bearing race.

The U.S. Pat. No. 2,860,406 shows a roller assembly and another roller retention mechanism which is extremely expensive when compared to my roller assembly and roller retention mechanism. First, there is a dummy tubular plug which enters somewhat loosely inside the circular arrangement of rollers. This plug must have two radially bored holes, offset axially and possibly circumferentially one from the other. Second, there is a formed wire clip which must be entered inside the bore of the tubular plug and the two bent ends fitted radially outward through the bored holes. Third, there must be a resilient rubber-like plug inside the bore of the tubular plug to hold the wire clip in place. This three-piece roller retaining assembly since it is relatively expensive to manufacture, has to be re-used to be feasible. This causes additional expenses for collecting, handling, shipping, storing and cleaning the roller retention mechanism.

My new roller mechanism and roller retention mechanism is extremely inexpensive and disposable. The roller retention mechanism is constructed to be a cheap, single-use, throw away item.

Briefly described, the roller assembly comprises a body with a bore such as an outer race for a bearing. Rollers are located inside the bore, extending longitudinally of the bore, and form a substantially closed circle of rollers abutting one another and also the raceway surface. A bent or folded spring including a portion located in a space between two adjoining rollers is adapted to push the rollers apart circumferentially so as to press all the rollers against the wall of the bore in a "keystone" effect wherein each roller is pressed radially outwardly of its two adjoining rollers with sufficient force so that the resultant roller-wall friction force prevents axial movement of the rollers and retains the rollers in the body. The "keystoning" also retains the rollers radially. The spring may be removed from the body after shipment, preferably by a simple axial push.

The invention, as well as its many advantages, may be further understood by reference to the following detailed discription and drawings in which:

FIG. 1 is a top view of one preferred embodiment of the invention;

FIG. 2 is a view taken along lines 2—2 of FIG. 1 and in the direction of the arrows;

FIG. 3 is a top view showing a second preferred embodiment of the invention;

FIG. 4 is a view taken along lines 4—4 of FIG. 3 and in the direction of the arrows;

FIG. 5 is a top view of still another preferred embodiment of the invention;

FIG. 6 is a view taken along lines 6—6 of FIG. 5 and in the direction of the arrows;

Figure 7:
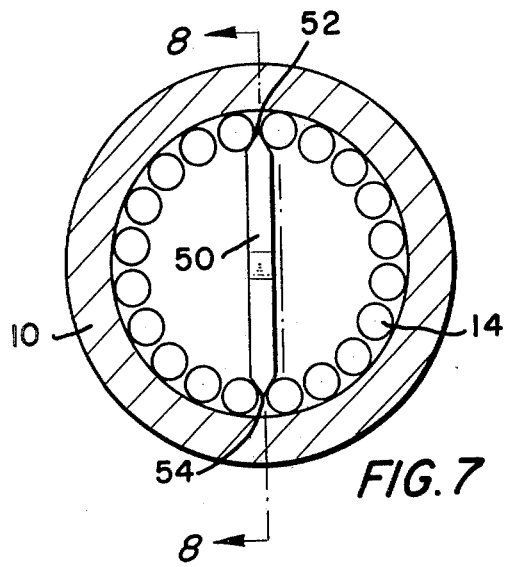
FIG. 7 is a top view of still another preferred embodiment of the invention.

Referring to the drawings and more particularly to FIG. 1 and FIG. 2, the roller assembly includes a casing or body 10. A bore 12 extends through the body 10. In the embodiment shown in FIG. 1 and FIG. 2, the bore 12 has the same diameter throughout its length and the body 10 has no flanges. However, if desired, one or more flanges may be provided at one or more ends of the body 10.

A plurality of rollers 14 extend lengthwise within the bore 12 and are in contact with the surface 16 of the bore 12. The rollers 14 abut one another and form a substantially closed circle of rollers.

A spring 18 is shown inserted into the bore 12. The spring 18 made of substantially rectangular in face view flat strip material, is in the shape of a "W" in cross-section taken perpendicular to the centerline of bore 12. Diametrically separated sides 20 and 22 of the spring 18 are rounded to facilitate the pushing of the spring axially into the circle of rollers with the resultant resilient compression of the spring and with each diametral sides of the spring wedging between two adjoining rollers, and then the later pushing out of the spring from the complement of rollers. Instead of being rounded, the sides 20 and 22 may be tapered axially with the proper lead-in angle. Even a single end taper may be used, be in this latter case, the proper end would have to be selected to lead when the spring is simply pushed axially into the circle of rollers at installations and pushed out at removal instead of being compressed by other means and deposited within the complement of rollers and released to resiliently expand in place. The surfaces and edges of the spring sides 20 and 22 are adapted to push the rollers circumferentially to cause the rollers to "keystone" and to press against the wall of the bore 12 with sufficient force to prevent axial or radial movement of the rollers 14 and thus to retain the rollers in the body.

The spring 18 may be easily removed from the body 10 and the circle of rollers by the axial push of an appropriate tool while the rollers themselves are restrained by other means.

The rounded sides 20 and 22 of the compressed spring 18 always seek the space between two adjoining rollers. They do not act against the radially innermost surface of the rollers 14, although if desired one side could be designed to ride on that surface. As the angled spring sides 20 and 22 wedge against and between two adjoining rollers, the circumferential components of the spring force press the first rollers against the other rollers circumferentially. These balanced circumferential forces cause the rollers to "keystone" and to be pressed against the wall 16 giving the required friction force to prevent axial motion of the rollers 16 and loss of the rollers axially from the body. The same "keystoning" forces keep the rollers from falling radially inward within the body and being lost that way. It is not essential that the rollers contacted by the spring lie exactly diametrically across the circle of rollers for the spring to perform its function.

In the embodiment shown in FIG. 3 and FIG. 4, the spring 30 is in the shape of a "V" in cross-section taken perpendicular to the centerline of bore 12. The diametrically arranged sides 32 and 34 are rounded to facilitate the axial movement of the spring into and out of the circle of rollers. The sides might alternatively be tapered axially.

In the embodiment of FIG. 5 and FIG. 6, the spring 40 is in the shape of a reversed "Z" in cross-section taken perpindicular to the centerline of bore 12. The diametrically arranged sides 42 and 44 of the spring 40 are each rounded to facilitate the axial movement of the spring into and out of the circle of rollers. Here agains the sides may be tapered instead of rounded to provide a "lead."

Figure 8:
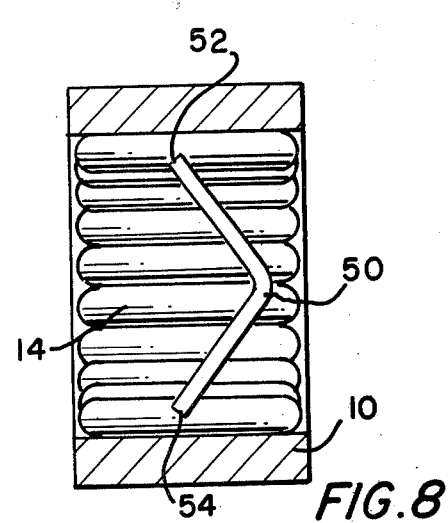
FIG. 8 is a view taken along lines 8—8 of FIG. 7 and in the direction of the arrows.

In the embodiment of FIG. 7 and FIG. 8, the spring 50 is a compressible flexible round wire folded into the shape of a "V" in cross-section taken parallel to the centerline of the bore. The diametrically arranged open ends 52 and 54 are pressed into a wedge shape to facilitate the axial movement of the spring 50 into the shape within the circle of rollers.

Figure 9:
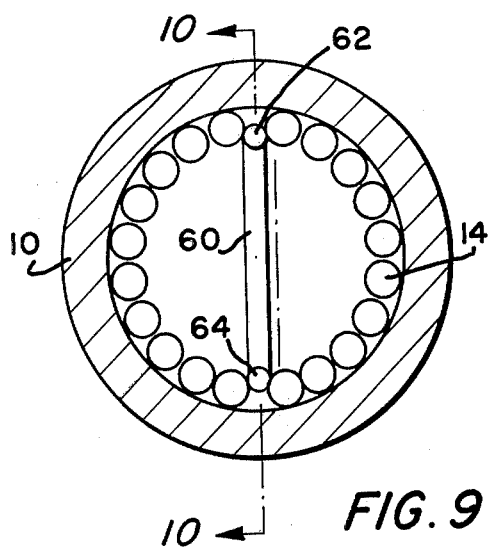
FIG. 9 is a top view of still another preferred embodiment of the invention.
Figure 10:
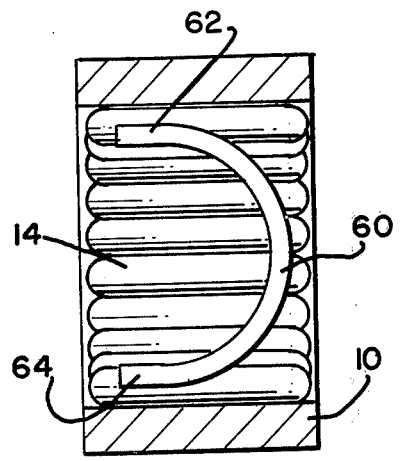
FIG. 10 is a view taken along lines 10—10 of FIG. 9 and in the direction of the arrows.

In the embodiment of FIG. 9 and FIG. 10, the spring 60 is a compressible flexible round wire folded into the shape of a "U" in cross-section taken parallel to the centerline of the bore. The shape of the round wire itself is such that the diametrically arranged sides 62 and 64 facilitate the axial movement of the spring 60 into the space within the circle of rollers.

Various other shapes of springs which bridge across the circle of rollers to wedge apart at least two rollers of the roller complement to accomplish the roller retention method of this invention, may be used. Examples would be oval or circular disc blanked out of strip stock and folded or curled out of the flat plane far enough to enter edge first within the circle of rollers where the natural resiliency of the disc would cause it to try to spring back to its original shape and thereby the "diametral side" edges wedge in between rollers.

The retention springs of each of the embodiments disclosed is inserted into the roller assembly by partially compressing the spring and inserting it within the circle of rollers so that the spring exerts its force radially of the circle of rollers and the diametral sides of the spring wedge between two adjoining rollers to forcefully push the rollers apart circumferentially until the rollers bear forcefully in the radial direction against the bore wall 16. The friction between the rollers and the wall prevent the rollers from moving axially in the body 10 during normal handling and shipping. The rollers are prevented from falling radially inwardly by the "keystoning" effect.

The spring compression, or folding radially inward, may be accomplished during insertion simply by pushing the uncompressed spring axially against and past one end of the roller complement with the "lead" of the rounded or tapered sides of the spring allowing those sides to "ride up on" the radially inner parts of the ends of the rollers and move radially inwardly, thus compressing the spring to give the desired resilient restorative force required to hold the rollers in place. The spring may also be pushed out of the circle of rollers, which now are in a mechanism or machine and are otherwise restrained against axial movement, through an adjacent housing bore which may have the same diameter as the diameter inside the circle of rollers, which bore will be smaller than the in-use overall width of the spring which has expanded slightly between the rollers. The "lead" on the sides of the spring will safely guide it through the bore without shaving material off the spring or the housing edge which might harm the bearing or the mechanism in which the bearing is mounted.

Starting with the coefficient of friction between the roller and the bore wall, and knowing the mass of the roller, and estimating the handling conditions which the circle of rollers must withstand without being lost axially from their place, the roller-to-wall contact force to produce the desired friction force can be calculated. From this, the required circumferential roller force can be calculated. Then, knowing the contact angles between spring and rollers, the required radial force of the spring can be calculated. The spring itself can then be constructed to fit into the available space to give the minimum radial force required and also to limit the maximum radial force so as not to cause damage to the spring or the rollers or the housing or an associated bore wall and not result in shaving being left in the bearing space or mechanism during installation, use, and removal of the spring.

My new spring retainer is extremely cheap and disposable. It can be blanked out and bent on a press at the rate of hundreds of pieces per minute if made of metal, and it can be molded at similar rates if made of synthetic plastic resin. It is meant for a single-use application and is discarded when removed from the bearing, although it could be re-used if that were desired. There is no collection for shipment back to the bearing company, no requirement for careful handling, and no concern about sharp burrs and edges raised on the springs due to damage during previous use and handling, which burrs and edges might harm bearing components or the mechanism if the springs were re-used.

I claim:

1. A roller assembly comprising: a body with a cylindrical bore; rollers extending lengthwise inside the bore and disposed along side and abutting one another in the bore so as to form a substantially closed circle of rollers; and a roller retention mechanism consisting of only a spring including a portion located in a space between two adjoining rollers and adapted to push these rollers apart circumferentially to keystone all the rollers and thus to press all the rollers against the wall of the bore with sufficient force to prevent axial movement of the rollers and to retain the rollers in the body.

2. A roller assembly in accordance with claim 1 wherein: the spring is a compressible flexible folded spring compressed within the circle of rollers, the spring having at least one side located to wedge between two adjoining rollers.

3. A roller assembly in accordance with claim 2 wherein: the spring has two sides, each located to wedge between two adjoining rollers, said two sides being substantially diametrically arranged within said circle of rollers.

4. A roller assembly in accordance with claim 2 wherein: the spring is in the shape of a "W" in cross-section taken perpendicular to the centerline of the bore and the diametrically arranged sides are shaped to facilitate the axial movement of said spring into the space within said circle of rollers.

5. A roller assembly in accordance with claim 2 wherein: the spring is in the shape of a "V" in cross-section taken perpindicular to the centerline of the bore and diametrically arranged sides are shaped to facilitate the axial movement of said spring into the shape within said circle of rollers.

6. A roller assembly in accordance with claim 2 wherein: the spring is in the shape of a reversed "Z" in cross-section taken perpendicular to the centerline of the bore and the diametrically arranged sides are shaped to facilitate the axial movement of said spring into the space within the circle of rollers.

7. A roller assembly in accordance with claim 2 wherein: the spring is a round wire in the shape of a "U" in cross-section taken parallel to the centerline of the bore.

8. A roller assembly in accordance with claim 2 wherein: the spring is a round wire in the shape of a "V" in cross-section taken parallel to the centerline of the bore, and the diametrically arranged open ends of the "V" are wedge shaped to facilitate the axial movement of said spring into the space within said circle of rollers.

* * * * *